United States Patent [19]

Bergkamp et al.

[11] Patent Number: 5,538,388
[45] Date of Patent: Jul. 23, 1996

[54] GRAIN CART EQUIPPED WITH INDEPENDENT HYDRAULICALLY DRIVEN DISCHARGE AUGERS

[75] Inventors: Alan Bergkamp, Murdock; Richard Jacobs, Harper; Gary Shellhammer, Anthony, all of Kans.

[73] Assignee: DewEze Manufacturing, Inc., Harper, Kans.

[21] Appl. No.: 401,867

[22] Filed: Mar. 10, 1995

[51] Int. Cl.$^6$ .................................................. B60P 1/40
[52] U.S. Cl. .................................. 414/523; 414/526
[58] Field of Search .................................. 414/326, 503, 414/505, 519, 523, 526

[56]                References Cited

U.S. PATENT DOCUMENTS

| Re. 24,920 | 1/1961 | Palmer . | |
|---|---|---|---|
| 2,296,014 | 9/1942 | Benzel, Sr. et al. . | |
| 2,772,767 | 12/1956 | Seifert . | |
| 2,877,914 | 3/1959 | Herr | 414/526 X |
| 3,021,025 | 2/1962 | Sudenga et al. . | |
| 3,337,068 | 8/1967 | Meharry . | |
| 3,561,681 | 2/1971 | Tyler . | |
| 3,575,306 | 4/1971 | Obermeyer . | |
| 3,638,812 | 2/1972 | Ryczek . | |
| 3,721,333 | 3/1973 | Boone . | |
| 4,093,087 | 6/1978 | DeCoene . | |
| 4,095,705 | 6/1978 | Hood | 414/519 |
| 4,274,790 | 6/1981 | Barker . | |
| 4,419,037 | 12/1983 | Niewold | 414/526 X |
| 4,427,105 | 1/1984 | Halwey et al. . | |
| 4,428,182 | 1/1984 | Allen et al. . | |
| 4,662,812 | 5/1987 | Busboom . | |
| 4,669,945 | 6/1987 | Pollard . | |
| 4,742,938 | 5/1988 | Niewold | 414/505 X |
| 4,781,513 | 11/1988 | ajogren et al. . | |
| 4,846,621 | 7/1978 | Warsaw . | |
| 4,907,402 | 3/1989 | Pakosh . | |
| 4,923,358 | 5/1990 | Van Mill | 414/526 X |
| 5,013,208 | 5/1991 | Griershop . | |
| 5,100,281 | 3/1992 | Griershop . | |
| 5,409,344 | 4/1995 | Tharaldson | 414/526 X |
| 5,433,520 | 7/1995 | Adams et al. | 414/526 X |
| 5,468,113 | 11/1995 | Davis | 414/523 |

FOREIGN PATENT DOCUMENTS

| 2412816 | 9/1975 | Germany | 414/505 |

OTHER PUBLICATIONS

United Farm Tools, Inc. Total Hydraulic Drive Grain Carts Brochure not dated.
J & M Manufacturing Co., Inc. Grain Carts Brochure; not dated.

*Primary Examiner*—James W. Keenan
*Attorney, Agent, or Firm*—Litman, McMahon and Brown

[57]                ABSTRACT

A grain cart is equipped with a lower and an upper discharge chute. Within each chute, a discharge auger is positioned to move grain or other particulate agricultural products up the chute. The cart includes a bin with four sides, each of which slopes toward the bottom center of the bin. An intake opening for the lower chute is positioned in the bottom center of the bin. The lower discharge chute extends from the bottom center of the bin and upward at an angle to a first discharge opening where grain is discharged from the lower chute into a sleeve which extends downward at an angle and which connects with an intake opening of the upper chute. The upper chute is rotatable about the sleeve and extends outward therefrom to a second discharge opening. A hydraulic actuator selectively rotates the upper discharge chute through an arc between a lowered transport position and a raised discharge position and separate, independently operable hydraulic motors are affixed to the lower end of the upper chute and the upper end of the lower chute to independently drive the respective augers therein.

5 Claims, 3 Drawing Sheets

GRAIN CART EQUIPPED WITH INDEPENDENT HYDRAULICALLY DRIVEN DISCHARGE AUGERS

BACKGROUND OF THE INVENTION

1. Field of the Invention

The present invention relates generally to a grain cart of the type used to transport and discharge harvested grain and other particulate agricultural products. The inventive cart is equipped with lower and upper discharge chutes and augers. The lower chute extends upward along the inside of the cart to a discharge opening which connects to an intake opening of the upper chute. The upper chute is connected to the cart via a swivel mount such that it can be rotated through an arc between a lowered transport position and a raised discharge position. Each auger is driven by an independent hydraulic motor.

2. Description of the Related Art

A variety of grain transport and discharge bins have been developed for agricultural use. Most modern combined thresher-harvesters incorporate a grain storage and discharge bin equipped with one or more auger driven discharge chutes. In these bins, it is typical for two or more augers to be driven by a single power source, such as the combine engine, for example. Generally the auger shafts in the plurality of discharge tubes are connected to each other via universal joints.

Truck mounted and trailer carried grain transport and discharge bins are also widely used. Often these bins will be used to offload grain from a combine or storage silo for transport to different storage or feeding locations. Again, it is typical for two or more discharge augers on such bins to be connected in series via universal joints and driven by a common engine or tractor power take-off drive unit. While this arrangement works reasonably well, typically an upper discharge chute must be capable of being rotated between an upright, discharge position and a horizontal, transport position. When the auger shafts are interconnected by a universal joint, rotational freedom of the upper discharge chute is restricted. Furthermore, in the case of tractor drawn grain carts, many large modern tractors are not equipped with power take-off drives, but, instead, with hydraulic fluid pumps, hose adaptors and control valves. Therefore, traditional grain carts with interconnected discharge chutes driven by a bottom-mounted PTO shaft will not work with these tractors.

Accordingly, it is clear that a need exists for an improved grain cart for the reliable transport and discharge of grain and other agricultural products. Such an improved cart should have lower and upper discharge chutes equipped with respective discharge augers, with the upper discharge chute being free to swivel between a secure storage position and a discharge position without being constrained by the drive system for either the lower or the upper discharge augers.

SUMMARY OF THE INVENTION

In the practice of the present invention, a grain cart is equipped with a lower and an upper discharge chute. Within each chute, a discharge auger is positioned to move grain or other particulate agricultural products up the chute to a discharge outlet. The cart includes a bin with four sides, each of which slopes toward the bottom center of the bin. An intake opening for the lower chute is positioned in the bottom center of the bin. A hydraulically movable plate selectively covers the intake opening. The lower discharge chute extends from the bottom center of the bin and upward at an angle along the confluence of two sides of the bin to a front top corner thereof. A discharge opening from the lower chute is positioned near this top front corner where grain is discharged from the lower chute into a sleeve which extends out of the bin and downward at an angle and which connects with an intake opening of the upper chute. The upper chute includes an L-shaped tube, one leg of which surrounds the sleeve and is rotatable with respect thereto. A chute extension connects with the other leg of the L-shaped tube and extends outward therefrom to a discharge opening. The L-shaped tube is rotatably supported on a bearing attached to an outboard support arm and includes a flange connected to a piston on a hydraulic cylinder. The cylinder selectively rotates the tube relative to the sleeve through an arc between a lowered, substantially horizontal transport position and a raised, angled discharge position.

Separate, independently operable hydraulic motors are affixed to the lower end of the upper chute and the upper end of the lower chute and are connected to the auger drive shafts therein to drive the respective augers.

OBJECTS AND ADVANTAGES OF THE PRESENT INVENTION

The objects and advantages of the present invention include: providing an improved grain cart; providing such a grain cart with lower and upper discharge chutes for discharging grain or other particulate agricultural materials from a storage bin on the cart; providing such a grain cart in which the lower and upper discharge chutes are each equipped with a discharge auger which is independently driven by a dedicated hydraulic motor; providing such a grain cart in which the upper discharge chute is rotatably mounted to a sleeve extending through a side wall of the bin and connecting between a discharge opening of the lower chute and an intake opening of the upper chute; providing such a grain cart with a hydraulic actuator for selectively rotating the upper chute through an arc between a lowered, substantially horizontal transport position and a raised, angled discharge position; providing such a grain cart which requires no power take-off or engine driven drive shaft to rotate the discharge augers; and providing such a grain cart which is economical to manufacture, efficient and convenient in operation, capable of a long operating life and which is particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

I. Introduction and Environment

Figure 1:
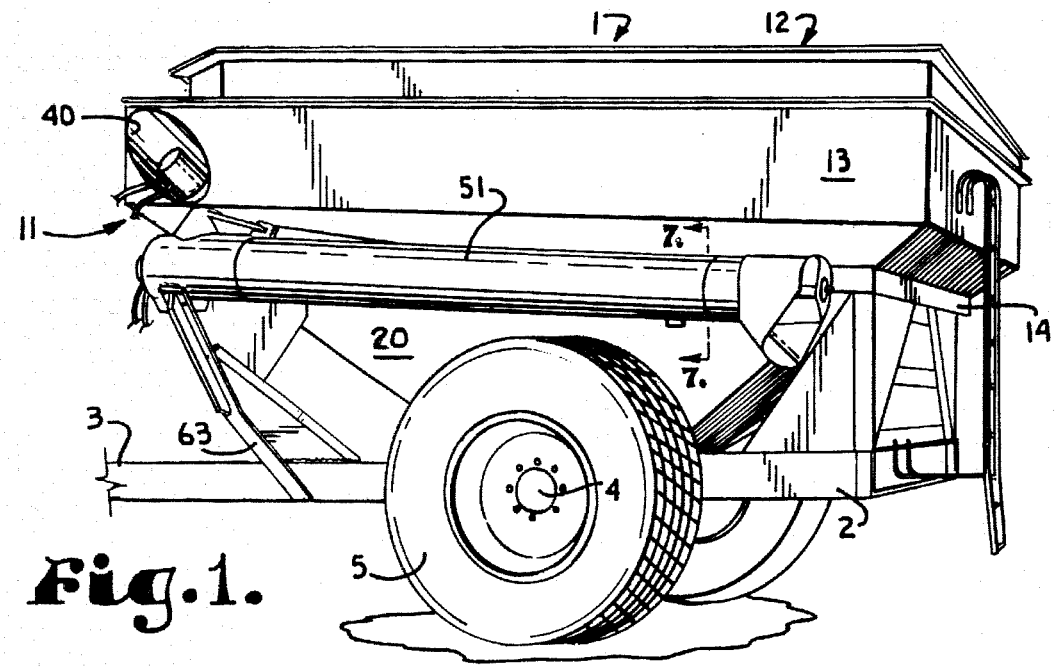
FIG. 1 is a perspective view of a grain cart in accordance with the present invention with an upper discharge chute rotated to a lowered, substantially horizontal transport position.

As required, detailed embodiments of the present invention are disclosed herein; however, it is to be understood that the disclosed embodiments are merely exemplary of the invention, which may be embodied in various forms. Therefore, specific structural and functions details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience and reference only and will not be limiting. For example, the words "up", "down", "right" and "left" will refer to directions in the drawings to which reference is made. The words "in" and "out" will refer to directions toward and away from, respectively, the geometric center of the structure being referred to. Said terminology will include the words specifically mentioned derivatives thereof and words of similar import.

II. Grain Cart

Figure 2:
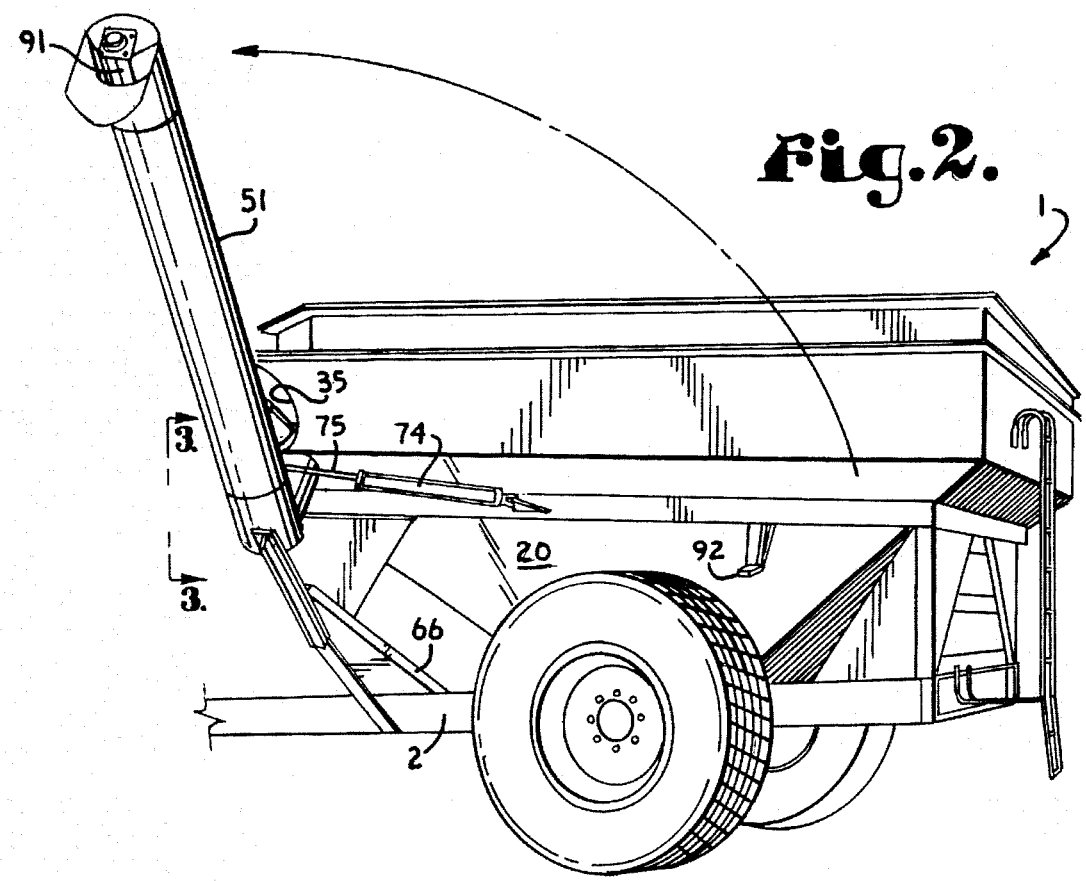
FIG. 2 is a perspective view of the grain cart of FIG. 1, with the upper discharge chute rotated to a raised, angled discharge position.
Figure 3:
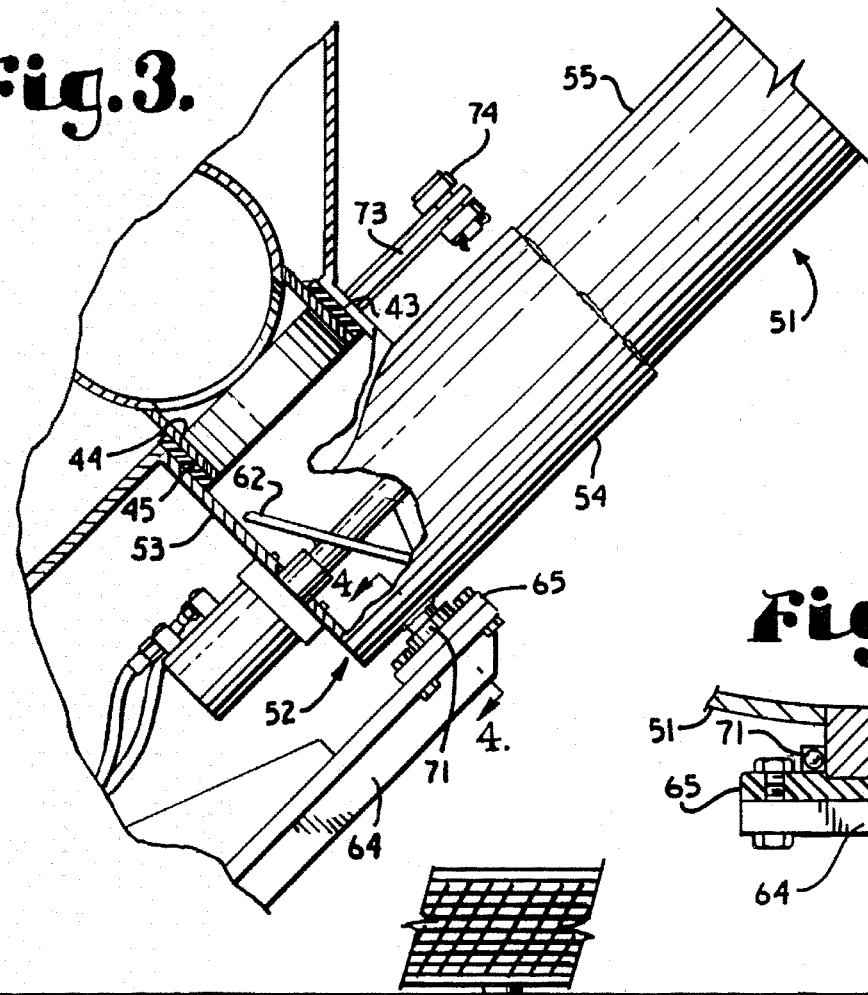
FIG. 3 is an enlarged, fragmentary view, taken along line 3—3 of FIG. 2, and with portions broken away to illustrate internal components of the upper discharge chute and the sleeve about which the upper chute is rotatably mounted.
Figure 4:
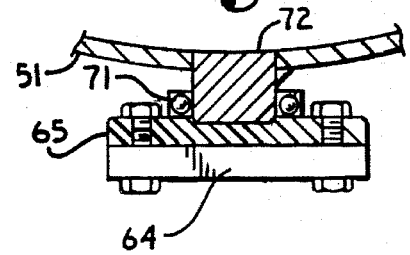
FIG. 4 is a greatly enlarged, fragmentary cross-sectional view, taken along line 4—4 of FIG. 3, illustrating a pivot shaft and support bearing for rotatably supporting the upper discharge chute.

Referring to the drawings in more detail, reference numeral 1 in FIGS. 1 and 2 generally designates a grain cart in accordance with the present invention. The cart 1 comprises a lower frame 2 connected to a tongue 3. The frame 2 is supported by an axle 4 with a pair of wheels 5 and 6 attached thereto.

Figure 5:
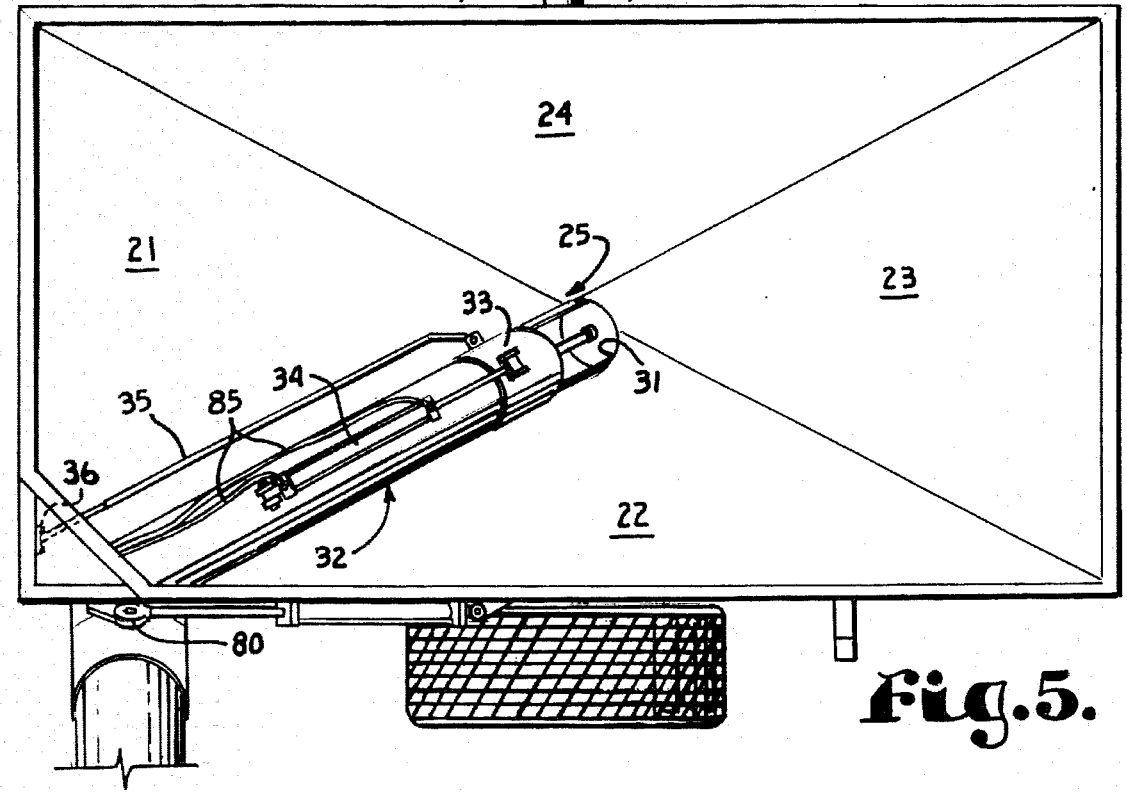
FIG. 5 is an enlarged, fragmentary top plan view of the inventive grain cart, illustrating the internal portions of a grain storage bin with a plate shown in a retracted position, thus uncovering a bottom center opening in the bin.
Figure 8:
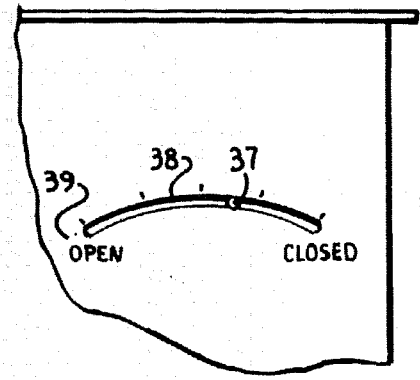
FIG. 8 is an enlarged, fragmentary of a portion of the front of the inventive cart, illustrating a plate position gauge slot and indicator.

A grain bin, generally indicated as 11, comprises an upper portion 12 with substantially vertical sidewalls 13. The grain bin 11 is supported by a rectangular framework 14 which is attached to the lower frame 2. Extending downward from the upper portion 12, the bin includes a lower portion 20 with four triangular sidewalls 21, 22, 23 and 24 (FIG. 5) each of which tapers inward and downward to converge at a bottom center point 25. In a conventional fashion, this structure directs all grain or other particulate material stored in the bin 11 toward the center point 25. Positioned at the center point 25 is an inlet opening 31 which leads to a lower discharge chute 32. A plate 33 is selectively movable via a double-acting hydraulic actuator 34 between a position at which it completely covers the opening 31 and a position (shown in FIG. 5) in which the opening 31 is completely uncovered. Of course, the plate 33 can be stopped at any desired interim position to thereby control the amount of grain entering the opening 31. A mechanical gauge arm 35 is attached to the plate 33 and extends upward to a rotary member 36 attached to the front wall 21. The rotary member 36 supports a movable indicator 37 which is movable in a semi-circular slot 38 (FIG. 8). The slot 38 includes indicia 39 so that the position of the plate 33 can be readily determined from outside the bin 11.

The lower discharge chute 32 extends upward along the confluence between the front wall 21 and the side wall 22, extending out an ovate opening 40 in the upper bin portion 12. Just below the opening 40, a discharge opening 41 (FIG. 6) opens into the lower chute 32. An auger 42 operating within the lower chute 32 thus brings grain or other particulate material up from the inlet opening 31 and discharges it out the opening 41. The opening 41 connects to the interior of a sleeve 43 which extends through a circular opening 44 in the bin side wall 22. The sleeve 43 is welded or otherwise rigidly attached to the side wall 22 and an outer portion 45 of the sleeve 43 extends outward from the opening 44.

An upper discharge chute 51 includes an L-shaped tubular member 52. A first tubular leg 53 of the member 51 extends around the periphery of the sleeve outer portion 45. The first leg 53 is rotatable with respect to the sleeve outer portion 45. A second leg 54 of the tubular member 52 extends at approximately 90 degrees from the first leg 53 and is connected to a cylindrical extension 55. The cylindrical extension 55 and the second leg 54 of the member 51 collectively contain a discharge auger 62 which conveys grain up and out of the chute 51.

A support arm 63 is welded or otherwise attached to the frame 2 and extends upward and outward at an angle therefrom. The support arm 63 includes an angle member 64 to which is attached a bearing plate 65. A brace 66 extends from the angle member 64 to the lower frame 2. The plate 65 supports a bearing 71 within which is rotatably positioned one end of a shaft 72. The other end of the shaft 72 is welded or otherwise attached to an outer surface of the upper discharge chute 51. The entire discharge chute 51 is thus rotatably supported between the bearing plate 65 and the outer sleeve portion 45. A pivot arm 73 is rigidly attached to the outside surface of the first leg 53 of the L-shaped member 52. A double acting hydraulic actuator 74 is pivotally attached to frame 14 and includes a piston 75 which is pivotally attached to the pivot arm 73 via a clevis 80. When the piston 75 is extended or retracted by the actuator 74, the upper discharge chute 51 is selectively rotated between an raised discharge position, as shown in FIG. 2, and a lowered transport position, as shown in FIG. 1.

A first hydraulic motor 81 is connected to a drive shaft 82 of the upper discharge auger 62, and a second hydraulic motor 83 is connected to a drive shaft 84 of the lower discharge auger 42. The upper and lower augers 62 and 42 are thus separately and independently driven by the hydraulic motors 81 and 83, respectively, while the motors 81 and 83, as well as the hydraulic cylinders 34 and 74 are all positioned to allow convenient routing of hydraulic lines, such as the lines 85, to access to hydraulic pumps and valves on a towing vehicle (not shown).

Figure 6:
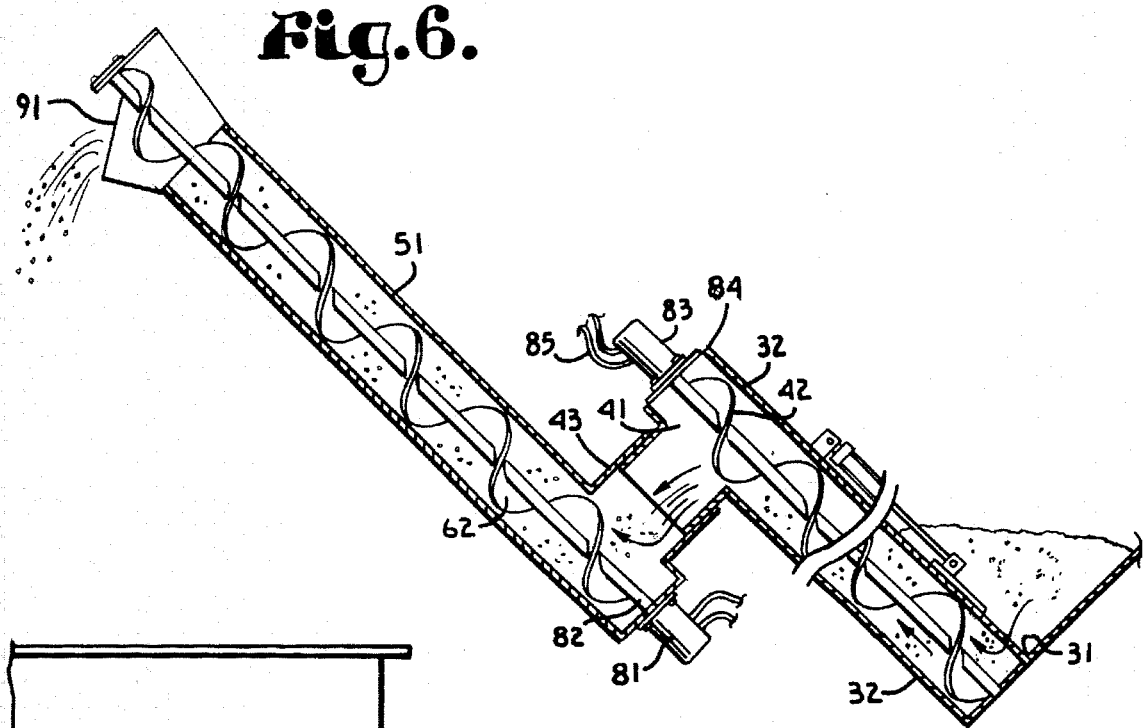
FIG. 6 is an enlarged, partially schematic view of the lower and upper discharge chutes, illustrating the path of movement of grain from the storage bin and thence upward and out of the discharge chutes.

FIG. 6 illustrates grain entering the intake opening 31 in the lower discharge chute 32 and being conveyed upward to the discharge opening 41. The grain then falls through the sleeve 43 and into the L-shaped member 52 where it is conveyed upward through the upper discharge chute 51 to a discharge outlet 91.

Figure 7:
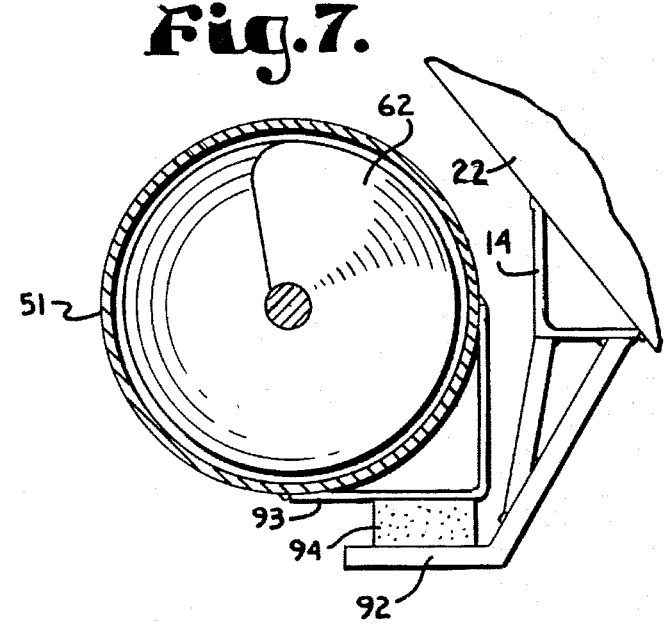
FIG. 7 is an enlarged, fragmentary cross-sectional view, taken along line 7—7 of FIG. 1, illustrating a support rest and pad for the upper chute when it is rotated to the lowered transport position.

FIG. 7 illustrates a horizontal support bracket 92 attached to the frame 14 and extending outward therefrom. A short length of angle member 93 is, in turn attached to the periphery of the upper discharge chute 51. A resilient pad 94 is attached to the support bracket 92, and, when the upper discharge chute 51 is rotated to the lowered, transport position, as shown in FIG. 1, the angle member 93 rests on the resilient pad 94. The bracket 92 and pad 94 thus provide a secure and resilient rest for the upper chute 51 during transport of the grain cart 1.

It is to be understood that while certain forms of the present invention have been illustrated and described herein, it is not to be limited to the specific forms or arrangement of parts described and shown.

What is claimed and desired to be secured by letters patent is as follows:

1. A grain storage and transport cart comprising:

a. a frame supported by a pair of wheels and an axle;

b. a storage bin connected to said frame and having downwardly converging sidewalls converging at a bottom of said bin;

c. a lower discharge chute secured within said bin such that a lower end of said lower discharge chute, having a first intake formed therein, is positioned proximate said bin bottom; said lower discharge chute further having a first discharge opening formed on a side of said lower discharge chute;

d. a lower auger rotatably mounted within said lower discharge chute for conveying material through said lower discharge chute from said first intake upward to said first discharge opening;

e. a sleeve connected at one end to said discharge chute in encircling relationship with said first discharge opening and having a sleeve interior communicating with said first discharge opening; said sleeve extending through a sleeve receiving opening in one of said downwardly converging sidewalls of said bin;

f. an upper discharge chute having a second intake in a lower end thereof and having a second discharge opening formed in an upper end thereof; said upper discharge chute rotatably connected to a portion of said sleeve extending outside of said bin such that said second intake communicates with said sleeve interior, said upper discharge chute being rotatable about said sleeve through an arc between a lowered, transport position, wherein at least a portion of said upper discharge chute extends along and below an upper portion of said downwardly converging sidewall, and a raised, discharge position; and g. an upper auger rotatably mounted within said upper discharge chute for conveying material from said second intake upward to said second discharge opening, said upper auger being driven independently of said lower auger.

2. The cart as in claim 1 further comprising:

a. a first hydraulic motor connected to a drive shaft of said lower auger to rotatably drive said lower auger; and b. a second hydraulic motor connected to a drive shaft of said upper auger to rotatably drive said upper auger.

3. The cart as in claim 1 wherein:

a. said storage bin comprises an upper portion with substantially vertical sidewalls extending above said downwardly converging sidewalls; and b. an upper end of said lower discharge chute extends to a chute opening in one of said vertical sidewalls.

4. A vehicle as in claim 1, and further comprising:

a. an actuator for selectively rotating said upper chute about said sleeve through an arc between said transport and said discharge positions.

5. A vehicle as in claim 4, and further comprising:

a. a support arm supporting a bearing, said bearing being positioned outboard of said upper discharge chute;

b. a shaft rigidly connected to said upper discharge chute and rotatably connected to said bearing, such that said upper discharge chute is rotatably supported between said bearing and said sleeve.

\* \* \* \* \*